US005542252A

United States Patent [19]

Hung

[11] Patent Number: 5,542,252

[45] Date of Patent: Aug. 6, 1996

[54] SAFETY VALVE STRUCTURE FOR HYDRAULIC JACKS

[76] Inventor: Michael Hung, 9-16, Nan Kan Hsia, Nan Kan, Lu Chu Hsiang, Tao Yuan County, Taiwan

[21] Appl. No.: 437,589

[22] Filed: May 9, 1995

[51] Int. Cl.$^{6}$ .............................. F16D 31/02; B66F 3/24

[52] U.S. Cl. .............................. 60/477; 254/93 H

[58] Field of Search .............................. 60/477, 478, 479, 60/481, 403, 406; 254/423, 93 R, 93 H

[56] References Cited

U.S. PATENT DOCUMENTS

| | | | |
|---|---|---|---|
| 1,904,115 | 4/1933 | Bacon | 254/93 H X |
| 2,042,727 | 6/1936 | Mueller | 60/481 |
| 2,837,312 | 6/1958 | Troche | 254/423 |
| 3,228,658 | 1/1966 | London | 60/481 X |
| 3,255,587 | 6/1966 | London | 60/481 |
| 3,871,619 | 3/1975 | Simon | 60/481 X |
| 4,151,720 | 5/1979 | Vanderstappen | 60/479 |
| 4,357,798 | 11/1982 | Hung | 60/477 |
| 4,625,944 | 12/1986 | Mankey et al. | 254/93 R X |
| 4,703,916 | 11/1987 | Hung | 254/93 H |
| 4,823,588 | 4/1989 | Bussereau et al. | 60/477 X |

*Primary Examiner*—Edward K. Look
*Assistant Examiner*—Hoang Nguyen
*Attorney, Agent, or Firm*—Wenderoth, Lind & Ponack

[57] ABSTRACT

A hydraulic jack safety valve structure provided within the one-way valve body of the jack. The one-way valve has a cylindrical shape and is provided on the pump base of the jack. An annular slot is provided in the cylindrical body. The annular slot is provided with an oil inlet port and an L-shaped oil inlet passage which extends from the top surface of the one-way valve. An oil discharge port is provided so that the top of the one-way valve communicates with the bottom. The wall of the annular slot is provided with a safety oil discharge port which communicates with the oil discharge passage. Inside the safety oil discharge passage, a push pin and a safety spring are inserted in proper sequence. An adjustment screw is used to secure the pin and spring in place. The push pin, inside the safety oil discharge passage, provides flow guidance so that the flow of the hydraulic discharge fluid can be smooth.

4 Claims, 3 Drawing Sheets

SAFETY VALVE STRUCTURE FOR HYDRAULIC JACKS

BACKGROUND OF THE INVENTION (a) Field of the Invention

The present invention relates to an improved safety valve structure for a hydraulic jack, particularly to an improved structure of the safety valve inside a pump base of the jack so that high pressure hydraulic fluid can smoothly and accurately flow through the valve and return to a reservoir.

(b) Description of the Prior Art

A one-way valve is usually provided between the reservoir and the pump base of a hydraulic jack. The one-way valve is used to control hydraulic fluid flowing from the reservoir into a pump. The valve also cooperates with the up-and-down movement of a lever on the jack so that the hydraulic fluid can be forced into a pressure tank for pushing a piston upward. When the jack is overloaded and the hydraulic pressure inside the jack has reached a predetermined limit, a safety device is needed to discharge the hydraulic fluid back into the reservoir. A conventional safety device uses a steel ball and a safety spring secured by an adjustment screw. The adjustment screw is used to adjust the pressure of the safety spring which presses against the steel ball. When the pressure inside the pressure tank is higher than the pressure of the safety spring set by the adjustment screw, the steel ball will automatically be pushed rearwardly against the force of the safety spring so that the safety spring is compressed, thus enabling the steel ball to disengage from a valve seat. Thus, the path previously closed by the steel ball is opened and the hydraulic fluid can return to the reservoir, thereby lowering the pressure within the pressure tank and preventing the pressure tank from cracking or exploding. However, the operation of the above arrangement is not reliable, since it is easy for the steel ball to deviate from an opening path of movement. Therefore, discharge of the hydraulic fluid is unstable and results in rough operation.

SUMMARY OF THE INVENTION

The main object according to the present invention is to provide an improved safety valve structure for hydraulic jacks. The structure is provided with a push pin, a safety spring and an adjustment screw. The end of the push pin is placed inside the axial hole of the adjustment screw. The adjustment screw is used to adjust the compression of the safety spring so as to control the pushing force of the push pin. By such configuration, the push pin can be used to seal the opening as well as to guide the hydraulic flow when the push pin is retracted. Thus, it provides for smooth operation when the hydraulic oil is discharging.

BRIEF DESCRIPTION OF THE DRAWINGS

The drawings disclose an illustrative embodiment of the present invention which serves to exemplify the various advantages and objects thereof, wherein.

DETAILED DESCRIPTION OF THE PREFERRED EMBODIMENT

Figure 1:
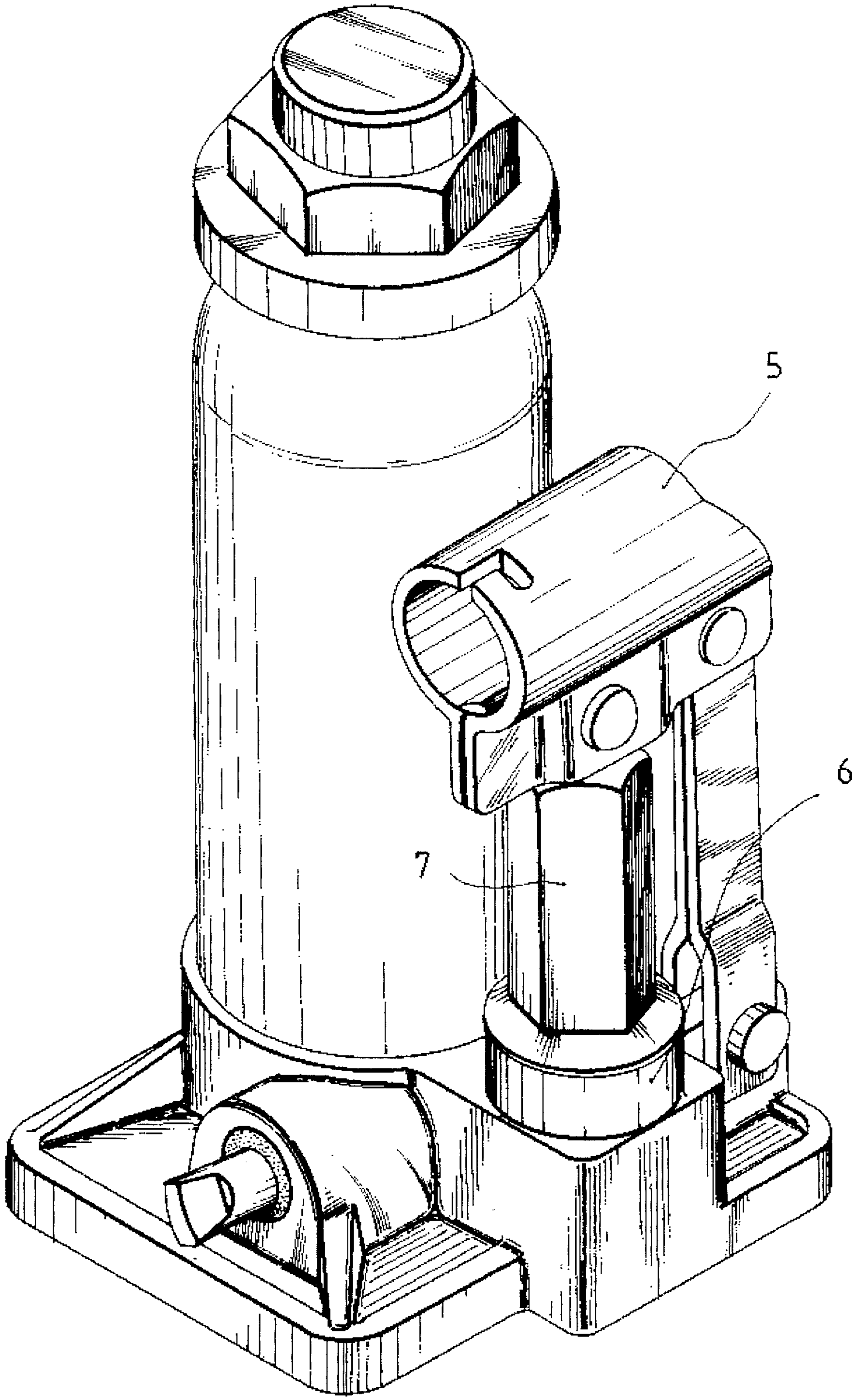
FIG. 1 is a perspective view of an embodiment according to the present invention.
Figure 2:
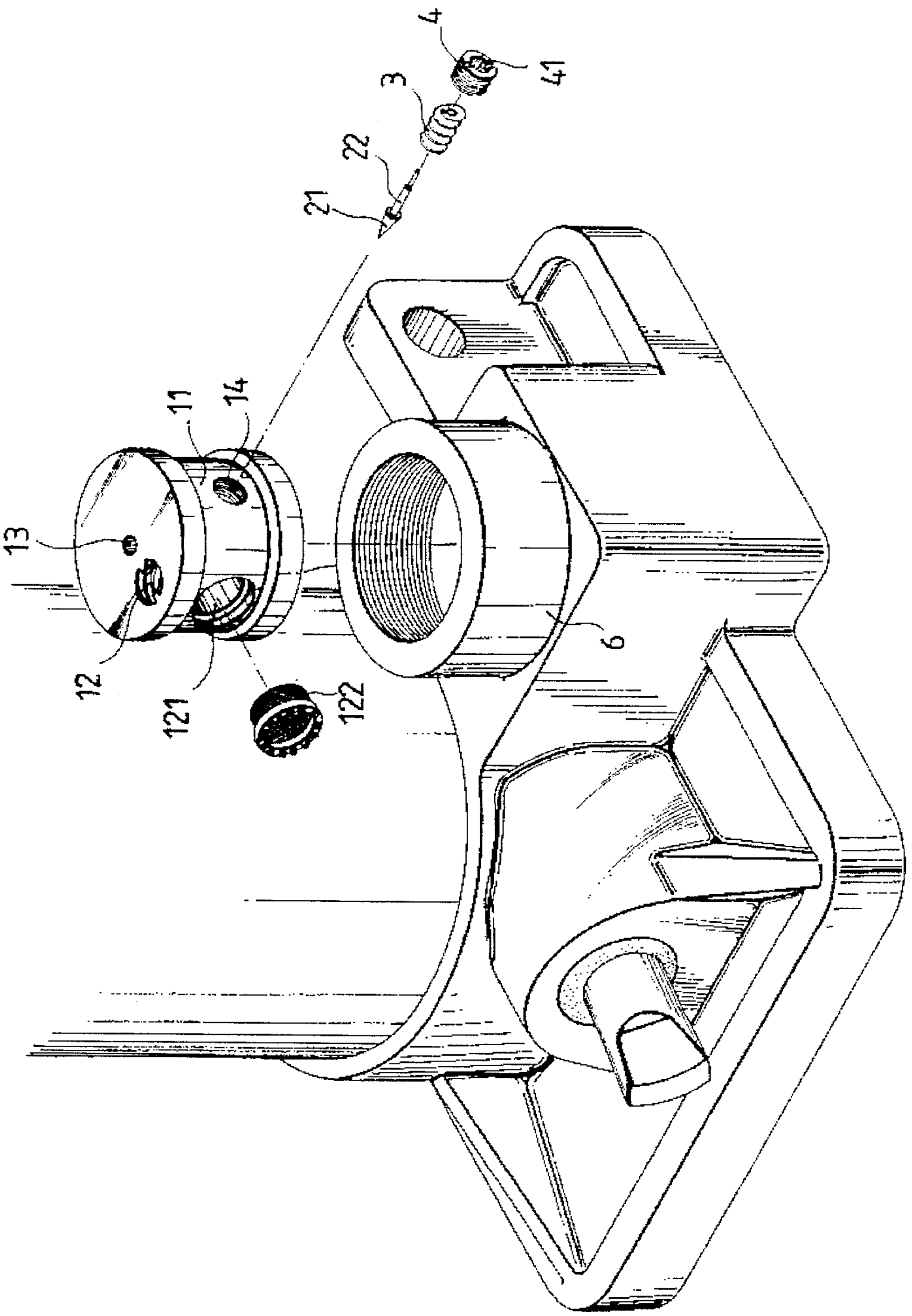
FIG. 2 is a perspective fragmented view according to the present invention.
Figure 3:
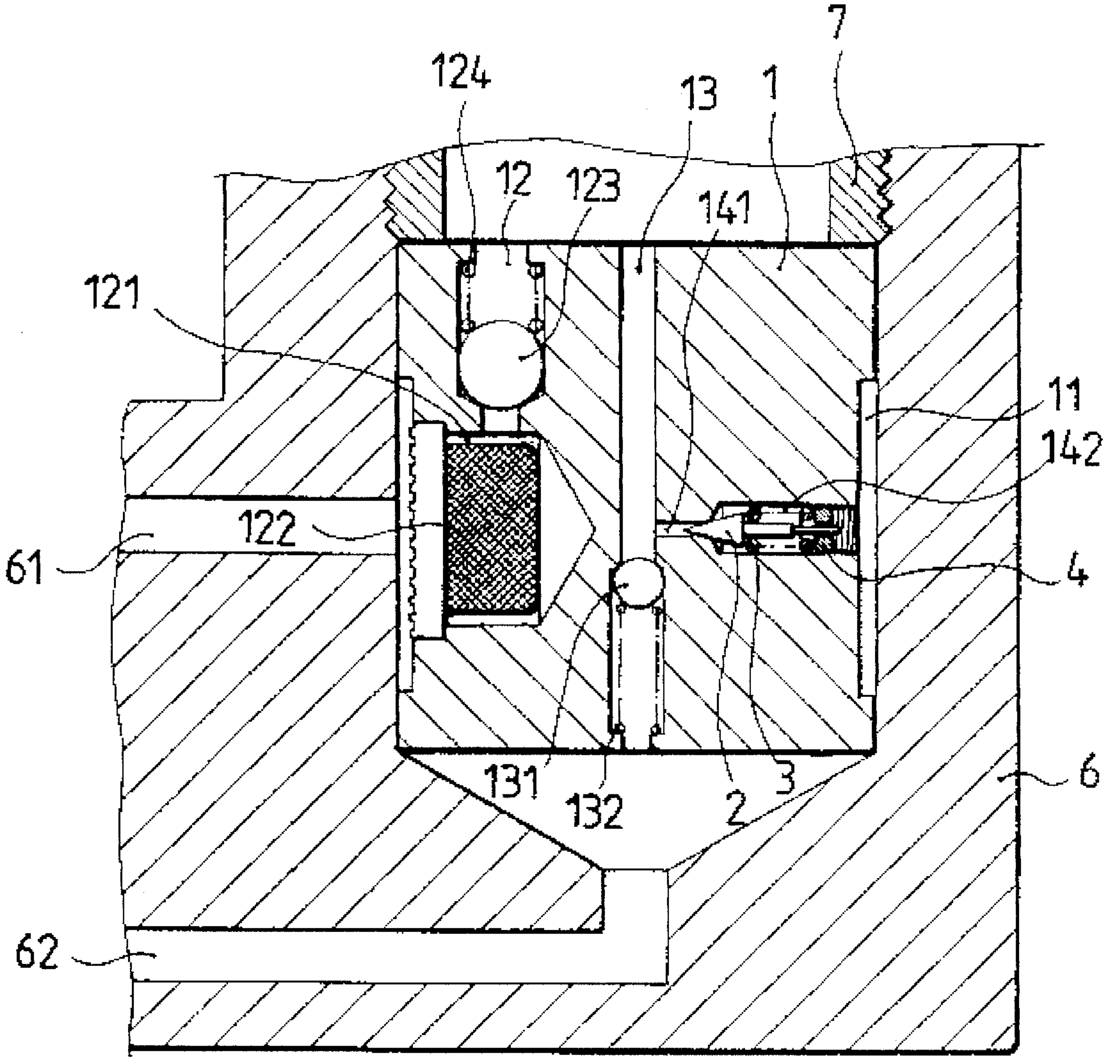
FIG. 3 is a cross-sectional view of an assembly according to the present invention.

As shown in FIGS. 2 and 3, a safety valve according to the present invention is provided inside a valve body of a one-way valve 1 of a hydraulic jack. The one-way valve 1 is provided inside a pump base 6 of the hydraulic jack and a pump 7 is provided on the pump base 6. The one-way valve 1 includes a cylindrical valve body. The cylindrical valve body has an annular recess or slot 11 formed in an exterior wall thereof.

An L-shaped oil inlet channel 12 defines an oil inlet port 121 at slot 11 and a port opening at the top surface of the one-way valve 1. A filtering screen is provided in the inlet channel 12 at oil inlet port 121. The L-shaped oil inlet channel 12 is a two-step channel having a larger diameter portion at the top and a smaller diameter portion at the bottom. A steel ball 123 and a compressed spring 124 are provided in the larger portion of the channel. The compressed spring 124 engages a projection defining the upper opening so as to be secured without disengaging. Also, the steel ball 123 seals the upper neck opening of the smaller diameter portion of the channel. In addition, the top surface of the one-way valve 1 is provided with an oil discharge port or hole 13, which is a two-step passage or hole having a larger diameter bottom portion and a smaller diameter top portion. The larger diameter portion of the channel is provided with a steel ball 131 and a compressed spring 132. The compressed spring 132 is secured in place by engaging an inwardly extending projection defining a bottom opening. Also, steel ball 131 seals the bottom opening of the smaller diameter portion. In addition, the wall of the annular slot 11 of the one-way valve 1 is provided with a safety oil discharge port or hole 14, which communicates with the smaller channel portion of the oil discharge port or hole 13.

As shown in FIGS. 2 and 3, the safety oil discharge hole 14 is a two-step passage or hole having a smaller diameter portion 141 which communicates with the smaller portion of the oil discharge hole 13. A rearward section of a larger diameter portion 142 is provided with inner screw threads. A push pin 2, as well as a safety spring 3, are placed in the larger portion 142 and an adjustment screw 4 is used to secure the pin 2 and spring 3 in place. A forward portion of push pin 2 is a cone-shaped body 21 and a rearward portion is a two-step rod or post 22, in which a large-diameter portion is inserted into the safety spring 3 in the axial direction, the small-diameter portion is inserted into an axial hole 41 of the adjustment screw 4. In this configuration, the resilient force of the safety spring 3 is applied so that the cone-shaped body 21 of the push pin 2 seals an end of the smaller portion 141 of the safety oil discharge passage 14. An end of safety spring 3 is engaged by adjustment screw 4, which is screwed and secured inside the larger portion 142 of the safety oil discharge hole 14. Also, the force of the safety spring 3 and thus the sealing force of push pin 2, can be adjusted by adjusting the adjustment screw 4 in the larger portion 142 of the safety oil discharge hole 14. In addition, the axial hole 41, provided on top of the adjustment screw 4, is used for discharge of the hydraulic fluid.

By use of the push pin 2, provided in the safety oil discharge hole 14 to cooperate with the safety spring 3 and the adjustment screw 4, the pump 7 can be removed and the one-way valve 1 can be taken out. By turning the adjustment screw 4, the compression ratio of the safety spring 3 can be set and the force of the push pin 2 acting against the smaller portion 141 of the safety oil discharge hole 14 can also be adjusted. Thus, the force from the safety spring 3 pushing against the push pin 2 can be set as the critical value of the hydraulic safety load coefficient. In other words, safety spring 3 and push pin 2 limit the pressure of the hydraulic jack. During operation, when the safety load value of the hydraulic fluid within the jack reaches the limit (i.e., when the load exceeds the setting of the push pin 2), the push pin 2 inside the safety oil discharge hole 14 is displaced backwardly by the hydraulic pressure and compresses the safety spring 3. At this time, the push pin 2 disengages from the smaller portion 141 of the safety oil discharge hole 14 and therefore, the hydraulic circuit is a closed circuit. This means that the hydraulic oil can circulate through the safety oil discharge hole 14, the axial hole 41 of the adjustment screw 4, the annular slot 11 of one-way valve 1 and return into the oil storage tank, allowing the pressure inside the jack to be depressurized. When the pressure inside the hydraulic jack decreases to within the safety load limit, the force from the safety spring becomes higher than the internal hydraulic pressure of the hydraulic jack, and therefore, the safety spring 3 automatically biases the push pin 2 forward so as to seal off the small portion 141 of the safety oil discharge hole 14. By this setup, the safety of the hydraulic jack can be assured and an explosion can be prevented. In addition, the push pin 2 is a linear fluid guide inside the safety oil discharge hole 14. When the latter is discharging, turbulence is prevented and a smooth operation can be assured. It is indeed a compact, practical and modern design.

By use of the above configuration, the flow of the hydraulic oil is described as follows: when the lever 5 is pulled up, the hydraulic oil inside the reservoir is sucked through an inlet 61 inside of the pump base 6. The oil follows the L-shaped oil inlet channel 12 and flows into pump 7. When lever 5 is pressed downwardly, hydraulic oil inside pump 7 is forced out through oil discharge hole 13 of the one-way valve. The oil follows an outlet path 62 of pump base 6 back into the pressure tank of the hydraulic jack so as to drive a piston up for lifting (now shown in Figure). However, if the lifting load of the jack exceeds the maximum design load and a user continues to operate lever 5 to force hydraulic oil into the pressure tank; the pressure could cause the pressure tank to crack or explode. Therefore, when the hydraulic pressure exceeds the safety limit, the improved safety valve structure, according to the present invention, allows the hydraulic pressure to push the push pin 2 inside the safety oil discharge hole 14 backwardly so that the hydraulic oil can follow the path through the annular slot 11 and through the inlet path 61 of the pump base and then return into the oil reservoir. Thus, the pressure inside the pressure tank can be controlled. In addition, the structure of push pin 2 provides a linear fluid guide so that the oil flow is smooth and accurate.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A valve for a hydraulic jack comprising:

a cylindrical valve body having an annular exterior wall having therein an annular recess;

a fluid inlet port formed in said recess;

a first port formed in an upper surface of said valve body;

a first passage, which is L-shaped, extending through said valve body from said first port to said fluid inlet port, wherein a longer leg of said L-shaped first passage includes a larger width portion extending from said upper surface of said valve body and a smaller width portion extending downwardly from said larger width portion;

a ball and spring provided in said larger portion of said fluid inlet passage, said spring engaging a radial wall portion projecting inwardly from an inner peripheral surface of said first passage, wherein said ball is positioned between an upper end of said smaller width portion and said spring;

a second port formed in said upper surface of said valve body;

a port formed in a bottom surface of said valve body;

a second passage extending through said valve body from said second port to said bottom surface port, wherein said second passage includes a larger width portion extending upwardly from said bottom surface port and a smaller width portion extending from said larger width portion to said second port;

a ball and spring provided in said larger width portion of said second passage, said spring engaging a radial wall portion projecting inwardly from an inner peripheral surface of said second passage, wherein said ball is positioned between a lower end of said smaller width portion of said second passage and said spring;

a safety fluid discharge port in said recess;

a port formed in a sidewall of said second passage at said smaller width portion;

a third passage extending through said valve body from said safety fluid discharge port to said port formed in said inner sidewall of said second passage, wherein said third passage includes a smaller width portion extending from said sidewall port and a larger width portion extending from said safety fluid discharge port;

a member, provided in said larger diameter portion, having an axial hole therethrough;

a push pin in said larger width portion of said third passage, said push pin having a cone shaped portion including an apex which extends into said smaller width portion and a rod extending from said cone shaped portion through said member to guide linear movement of said push pin;

a spring interposed between said push pin cone shaped portion and said member, said spring biasing said cone portion into engagement with an end of said smaller width portion of said third passage.

2. The valve as claimed in claim 1, wherein said larger width portion of said third passage is at least partially threaded and said member provided in said larger width portion of said third passage comprises an adjustment screw having a threaded exterior surface.

3. The valve as claimed in claim 1, further comprising a filtering screen provided in said fluid inlet port.

4. The valve as claimed in claim 1, wherein said rod comprises a large diameter portion extending from said cone shaped portion and a small diameter portion which extends from said large diameter portion through said member.

* * * * *